United States Patent Office 3,322,718
Patented May 30, 1967

3,322,718
POLYOLEFINS STABILIZED WITH PHOSPHITES, PHENOLS, AND BENZOTRIAZOLES
Carl N. Jacob, Cincinnati, Ohio, assignor to National Distillers and Chemical Corporation, New York, N.Y., a corporation of Virginia
No Drawing. Filed Aug. 23, 1963, Ser. No. 304,215
1 Claim. (Cl. 260—45.8)

This invention relates to a method of stabilizing polymers of aliphatic olefins. In particular, this invention relates to a synergistic combination of compounds that protect polyolefin polymers against molecular degradation, color development, and ultra-violet light during processing and subsequent use.

Polymers of aliphatic olefins, and particularly, polypropylene, and other highly branched polyolefins have numerous valuable properties which permit them to be used in the manufacture of pipe, film, wire coating or various molded objects such as bottles and the like. It has been observed, however, that such polymers under conditions of elevated temperature and/or mechanical working, particularly in the presence of oxygen, and also in the presence of ultra-violet light, undergo degradation, resulting in a deterioration of physical properties. Adequate stabilization of such polymers is of utmost importance in order to protect the polymer during fabrication and in use.

It is an object of this invention to provide a new synergistic combination of stabilizers for polyolefin compositions. Another object is to provide novel polyolefin compositions containing a synergistic combination of compounds that improves the stability of the polyolefin compositions. Still another object is to provide novel polypropylene compositions having improved stability against molecular degradation, ultraviolet light, and color development during processing and in subsequent use. Other objects of the invention will be apparent from the description and claims that follow.

It has been discovered that polyolefin polymers can be stabilized, and degradation and color development prevented, by incorporating in them synergistic combinations of minor amounts of three components: (1) alkylated bisphenols, (2) organic phosphites of the aliphatic series, which phosphites include mono-, di- and trialkyl phosphites and alkylmercaptoalkyl phosphites, and (3) a substituted hydroxyphenyl benzotriazole.

The utilization of these three types of components in combination results in a stabilizing effect far in excess of that obtained by other combinations of components and a markedly improved product. For polypropylene this particular combination of the three components provides outstanding ultra-violet stability and mill stability, together with an especially attractive durability.

Although alkylated bisphenols alone are effective as an antioxidant in stabilizing polyolefins, the development of substantial and intermediate color is inevitable with these compositions. The alkyl phosphites or alkylmercaptoalkyl phosphites give an improved lighter color and contribute to some extent to stabilization of polypropylene when used as a sole stabilizer. Polypropylene which has been stabilized against ultraviolet radiation using only a substituted hydroxyphenyl benzotriazole will show improved weathering resistance. However, the utilization of all three of these components in synergistic combination results in a stabilizing effect far in excess of that obtained by other combinations of components, and a markedly improved product.

Many conventional additives which have been proposed for specific stabilization purposes have been found ineffective in polyolefin polymers. In addition the utilization of multiple stabilizers has resulted in many cases in an inhibiting effect of one on the other. Prediction of individual stabilizers has not been employed with any effectiveness because of the many factors and variables that one must contend with in attempting to find a compatible and balanced stabilization system. At least as unpredictable is the determination of whether or not a given combination of two or more stabilizer compounds will synergize to produce a stabilizing effect in polyolefins that is greater than the additive effect of the individual stabilizers. We know of no method whereby a combination of stabilizers can be predicted to be synergistic stabilizers for polyolefin compositions short of actually testing the combination in a polyolefin composition, even though the individual components comprising the combination may be well-known stabilizers for various polymers, resins or plastics including polyolefin compositions.

The polymers to which this invention applies are the normally solid polymers of aliphatic olefins having from 2 to 8 carbon atoms per molecule such as polymers of ethylene, propylene, 1-butene, isobutylene, 2-butene, 1-pentene and 1-hexene, and copolymers thereof. Polymers made from olefins having more than two carbon atoms, for example, polypropylene or butene-ethylene copolymers, are especially unstable as compared with polyethylene to thermal and ultra-violet degradation, and, therefore, require special additives for effective, thorough stabilization against the various types of break-down which are encountered in normal usage. The present invention is particularly suited to these polyolefins.

A great number of methods can be employed to prepare normally solid polymers of olefins which are stabilized by this invention. These polyolefins may be linear or branched and may have either an irregular or regular steric structure. The method of manufacture of the polyolefins is unimportant with respect to this stabilization process.

As the alkyl phosphite component, we use a substantially nonvolatile phosphite that, in the minor proportion used, is soluble in the polyolefin at elevated temperatures of softening, and non-separating therefrom at temperatures down to those of winter, as to $-60°$ F. or so. The alkyl phosphites that meet the requirements and illustrate the class to be used are the straight chain and branched chain trialkyl phosphites, such as tributyl, trioctyl, triisooctyl, tridodecyl, trioctadecyl and the like; also the alkylmercaptoalkyl phosphites suitable for use in the practice of this invention have the formula $(R-S-R')_nH_{3-n}PO_3$ wherein R is a saturated aliphatic hydrocarbon radical containing from 6 to 18 carbon atoms, R' is a saturated aliphatic hydrocarbon radical containing from 2 to 4 carbon atoms, and $n$ is an integer with a value of 1, 2, or 3. Examples of such compounds include tris(laurylmercaptoethyl) phosphite, tris(stearylmercaptoethyl) phosphite, bis(caprylmercaptobutyl) phosphite, mono(palmitylmercaptopropyl) phosphite, tri(2-ethylhexylmercaptoethyl) phosphite, and the like. In a preferred embodiment of this invention tris(laurylthioethyl) phosphite is employed.

The stabilization of polymers of aliphatic olefins with alkylmercaptoalkyl phosphites alone and the stabilization of aliphatic olefins with synergistic combinations of bisphenols and alkylmercaptoalkyl phosphites have been suggested previously, but the method and material contemplated by the present invention affords improved benefits thereover.

The alkylated bisphenols suitable for this invention include 4,4' - thio - bis(2-tert-butyl-5-phenol), 4,4'-bis(2-methyl - 6 - tert-butyl phenol), 4,4'-bis(2,6-di-tert-butyl phenol), 2,2' - methylene-bis(4-methyl-6-tert-butyl phenol), 2,2'methylene-bis(4-ethyl-6-tert-butyl phenol), 2,2'-methylene bis - (4 - methyl-6-tert-dodecylphenol), 2,2'-methylene bis-(4-tert-octyl-6-methylphenol), 2,2'-methylene bis-(4,6-tert-butylphenol), 2,2'-methylene bis-(4,6-tert-dodecyl-phenol), 2,2'-methylene bis-(4,6-diamyl-phenol), 2,2'-methylene bis-(4-tert-butyl-6-tert-dodecyl-phenol), 2,2'-methylene bis-(4,6-dioctylphenol), 2,2'-methylene bis-(4-butyl-6-amylphenol), and 2,2'-methylene bis-(4-octyl-6-dodecylphenol). Other alkylene bis-(dialkylphenols) can be used such as the corresponding ethylene, propylene and butylene bis-(dialkylphenols), for example 2,2'-ethylidene bis-(4-methyl-6-tert-butyl-phenol), 2,2'ethylidene bis - (4,5-ditertdodecylphenol), 2,2'-isopropylidene bis-(4-tert-butyl-6-amylphenol), 2,2'-isopropylidene bis-(4,6-ditert-dodecylphenol), and the like compounds.

The substituted hydroxyphenyl benzotriazole compounds suitable for ultra-violet light stabilization include particularly the 2(2'-hydroxy-5'-methylphenyl)benzotriazole. This compound has been employed as an ultra-violet stabilizer for a variety of plastics including polypropylene. The inhibition of surface crazing presents a significant contribution from the stabilizer. However, the compound itself or chemical modifications thereof are inadequate for the over-all stabilization of polyolefins, and in particular, polypropylene.

These compounds may be mixed with the polyolefin polymer in any suitable manner that will effect thorough distribution and dispersion. This can be accomplished in a machine suitable for mixing solids, as by milling the polyolefin with the additive on heated rolls such as are used in the compounding of rubber, or on other suitable milling or mixing equipment, such as for example, a Banbury mixer or conventional rubber mill. Instead of adding the stabilizing agent to the polymer in the solid or molten state, it can be added to a solution or suspension of polymer in an organic solvent or to an aqueous dispersion thereof, and the volatile solvent subsequently removed by vaporization. Another method is to dust the solid onto pellets of the resin and extrude the mixture.

In general, the amount of synergistic combination to be added to the polyolefin polymer depends upon the degree and kind of stabilization desired. The amount of the agent added can vary from 0.01% to 5.0% based on the weight of the polyolefin; as a rule it is preferred to use the minimum amount required to achieve the desired results.

The alkylated bisphenol, which will be referred to as the antioxidant, is used in a concentration of from about 0.005% to about 2.0% by weight of the polyolefin, the preferred ratio being within the range of 0.05% to 0.5%. The organic phosphite, which will be referred to as the color retarding agent, is used in a concentration of from about 0.005% to about 2.0% by weight of the polyolefin, the preferred ratio being within the range of 0.05% to 0.5%. The hydroxyphenyl benzotriazole, which is the ultra-violet stabilizer, is used in a concentration of from about 0.01 to 2.5% by weight of the polyolefin, the preferred ratio being within the range of 0.1% to 0.5%. In a preferred embodiment of my invention the antioxidant is present in an amount of 20-30%, the color retarding agent in an amount of 20-30%, and the ultra-violet stabilizer in the amount of about 50% by weight of the synergistic mixture of stabilizers.

The stabilizer combination of the present invention lends to polyolefin compositions improved stability during processing and subsequent use, and more specifically, improved stability against deterioration by heat and milling, ultra-violet light, and color formation. Thus, polyolefins stabilized in accordance with the invention have an extended life expectancy and can be used more effectively than unstabilized polyolefins for a wide diversity of uses. These polyolefins can be cast, extruded, rolled or molded into sheets, rods, tubes, piping filaments and other shaped articles, including widely used films of the polymer about 0.5 to 100 mils in thickness. The present composition can be used for coating paper, cloth, wire, metal foil, glass fiber fabrics, synthetic and natural textiles and other such materials. Likewise, small amounts of other additives such as other polymers, resins or plastics that are commonly added to polyolefins for specific uses and that are not deleterious to the effectiveness of the present synergistic combination can be used in the polyolefin compositions of the invention.

Following below are examples illustrating the invention although it is in no way intended to limit the invention thereto.

EXAMPLE I

*Preparation of the polyolefin-additive blend*

Dry 10 mesh granulated polyolefin is charged to a Hobart mixer, followed by 1% solutions of the antioxidant and color retarding agent respectively, in benzene or acetone. The mixture is tumbled until all of the solvent has evaporated. Usually this takes about 30 minutes. Then, when desired, the ultra-violet absorber is added as a 1% solution in acetone and tumbling is continued until all of the solvent has evaporated. Blending is completed by transferring the resultant dry blend to a two-roll rubber mill and milling for 10 minutes at 350° F.

*Ultra-violet weathering test*

Blends prepared as above described are compression molded into 30-mil plaques and tensile dumbbells are cut from these plaques. Initial tensiles are recorded on several specimens to obtain values at zero time exposure. The remaining specimens are then mounted on black cardboard and these in turn mounted on the revolving drum of an Atlas Weather-O-Meter. The drum is revolved around a carbon-arc lamp, maintaining the specimen temperatures at about 50° C. by spraying water on the back of the drum. Specimens are removed at various intervals, and the elongation is determined. Values are reported for the number of hours exposure required to reduce the elongation to 50% of that recorded for the initial, unexposed specimen.

*Oven stability*

Blends prepared as described are compression molded into 20-mil strips. These strips are then suspended in an air circulating oven maintained at either 125° or 150° C. At various intervals, specimens are removed, cooled to room temperature, and bent around a ¼-inch diameter copper tube. Failure occurs when a specimen cracks under this bending stress. A test value is then given in terms of the hours of exposure before cracking.

*Mill stability*

Blends prepared as above described, instead of being removed from the mill after 10 minutes, are submitted to further milling at 350° F. for a period amounting to 60 minutes from the time the polymer blend reaches flux (when all of the blend is melted and banded). Melt flow rates at 230° C. are determined on 30-gram samples taken upon initial fluxing and after the 60-minute milling period. Ratings are assigned in accordance with the magnitude of difference between the initial and final flow rates in accordance with the following table:

| Rating: | Change in melt flow rate, units |
|---|---|
| Superior | <0.5. |
| Excellent | 0.5–1.0. |
| Good | 1.1–2.0. |
| Fair | >2.0. |
| Poor | Failure in <60 minutes. |

*Color comparison*

A sample of blends prepared as described above after a 60-minute milling period is pressed into a 1″ x 1″ x 50-mil sheet and mounted on white cardboard for color comparison.

Test results are given in Table 1 to illustsate the use of the stabilizers for polypropylene. The percentages shown are percent by weight.

TABLE 1

| Stabilizer | Weather-O-Meter Stability, hr. | Mill Stability | Oven Stability, hr. | | Color |
|---|---|---|---|---|---|
| | | | 125° C. | 150° C. | |
| 1. 0.2% Cyanamid A.O. 162 [a]<br>0.2% tris(laurylmercaptoethyl)phosphite<br>0.5% Tinuvin P [b] | >400 | Superior | 340 | 312 | White—no haze. |
| 2. 0.5% Tinuvin P [b] | 300 | Poor | 20 | 15 | Could not measure. |
| 3. 0.2% Cyanamid A.O. 162 [a]<br>0.2% tris(laurylmercaptoethyl)phosphite | 192 | Superior | 192 | 48 | White—slight haze. |
| 4. Commercial polypropylene [c] | 192 | Fair | 192 | 72 | Light cream. |

[a] Cyanamid A.O. 162—2,2'-methylene-bis(4-ethyl-6-tert-butyl phenol).
[b] Tinuvin P—2(2'-hydroxy-5'-methylphenyl)benzotriazole.
[c] Stabilized against breakdown from heat and light with a combination of a nickel chelated hydroxybenzophenone, a hindered phenol, and dilaurylthiodipropionate.

As can be seen from the above table wherein polypropylene is stabilized with various stabilizer combinations, Tinuvin P is a good stabilizer towards ultra-violet light, but the three component combination is superior in this regard; the combination of the bis-phenol and the tris(laurylmercaptoethyl) phosphite is a very good heat stabilizer system, but it is improved in combination with Tinuvin P. Therefore, the mixture of stabilizers shows synergism of the components.

As will be evident to those skilled in the art, various modifications of this invention can be made or followed in the light of the foregoing disclosure and discussion without departing from the spirit or scope thereof.

What is claimed is:

Polypropylene stabilized with a synergistic combination of about 0.05 to 0.5 percent by weight based on the polymer of 2,2'-methylene-bis(4-ethyl-6-tert-butyl phenol); about 0.05 to 0.5 percent by weight based on the polymer of tris(laurylmercaptoethyl) phosphite; and about 0.1 to 0.5 percent by weight based on the polymer of 2(2'-hydroxy-5'-methylphenyl)benzotriazole.

References Cited

UNITED STATES PATENTS

| | | | |
|---|---|---|---|
| 2,587,616 | 4/1952 | Harman | 260—461 |
| 2,967,845 | 1/1961 | Hawkins et al. | 260—45.7 |
| 2,972,597 | 2/1961 | Newland et al. | 260—45.85 |
| 2,995,539 | 8/1961 | Barker et al. | 260—45.7 |
| 3,004,896 | 10/1961 | Heller et al. | 167—90 |
| 3,145,111 | 8/1964 | Norton | 260—45.95 |
| 3,149,093 | 9/1964 | Hecker et al. | 260—45.7 |
| 3,244,667 | 4/1966 | Burgess | 260—45.8 |

LEON J. BERCOVITZ, *Primary Examiner.*

M. J. WELSH, *Assistant Examiner.*